US005640122A

United States Patent [19]

McClure

[11] Patent Number: 5,640,122

[45] Date of Patent: Jun. 17, 1997

[54] CIRCUIT FOR PROVIDING A BIAS VOLTAGE COMPENSATED FOR P-CHANNEL TRANSISTOR VARIATIONS

[75] Inventor: David C. McClure, Carrollton, Tex.

[73] Assignee: SGS-Thomson Microelectronics, Inc., Carrollton, Tex.

[21] Appl. No.: 464,551

[22] Filed: Jun. 5, 1995

Related U.S. Application Data

[63] Continuation-in-part of Ser. No. 357,664, Dec. 16, 1994, Pat. No. 5,568,084, and Ser. No. 399,079, Mar. 8, 1995, abandoned.

[51] Int. Cl.[6] .......... H02J 1/00

[52] U.S. Cl. .......... 327/530; 327/537

[58] Field of Search .......... 327/108, 530, 327/534, 535, 537, 538, 543

[56] References Cited

U.S. PATENT DOCUMENTS

| | | | |
|---|---|---|---|
| 3,714,543 | 1/1973 | Sahara et al. | 323/4 |
| 4,716,307 | 12/1987 | Aoyama | 327/543 |
| 5,276,356 | 1/1994 | Shirotori | 327/170 |
| 5,357,149 | 10/1994 | Kimura | 327/543 |

*Primary Examiner*—Timothy P. Callahan
*Assistant Examiner*—Jeffrey Zweizig
*Attorney, Agent, or Firm*—Theodore E. Galanthay; Lisa K. Jorgenson; Peter J. Thoma

[57] ABSTRACT

A bias circuit for generating a bias voltage that tracks power supply voltage variations, and that is compensated for variations in p-channel transistor and process parameters, is disclosed. The bias circuit includes a voltage divider, such as a resistor divider, that produces a ratioed voltage based on the power supply voltage to be tracked. The ratioed voltage is applied to a first input of a differential stage, the output of which is applied to an intermediate stage including a drive transistor and a load; the second input of the differential stage receives a feedback voltage from an intermediate node that is connected to the source of a p-channel modulating transistor that has its gate biased so as to be in saturation, for example at ground. The current conducted by the p-channel modulating transistor depends upon the ratioed voltage from the voltage divider, and also on its transistor characteristics. This current is applied, via an output stage, to produce a reference voltage that tracks power supply voltage variations. This reference voltage may be applied, individually or in combination with an n-channel compensated reference voltage, to an output buffer to control output drive slew rates, or to a current source.

18 Claims, 3 Drawing Sheets

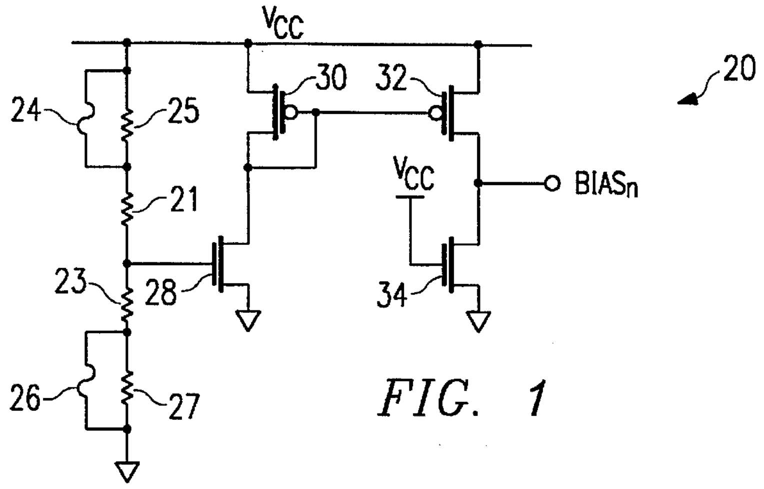
FIG. 1
FIG. 3
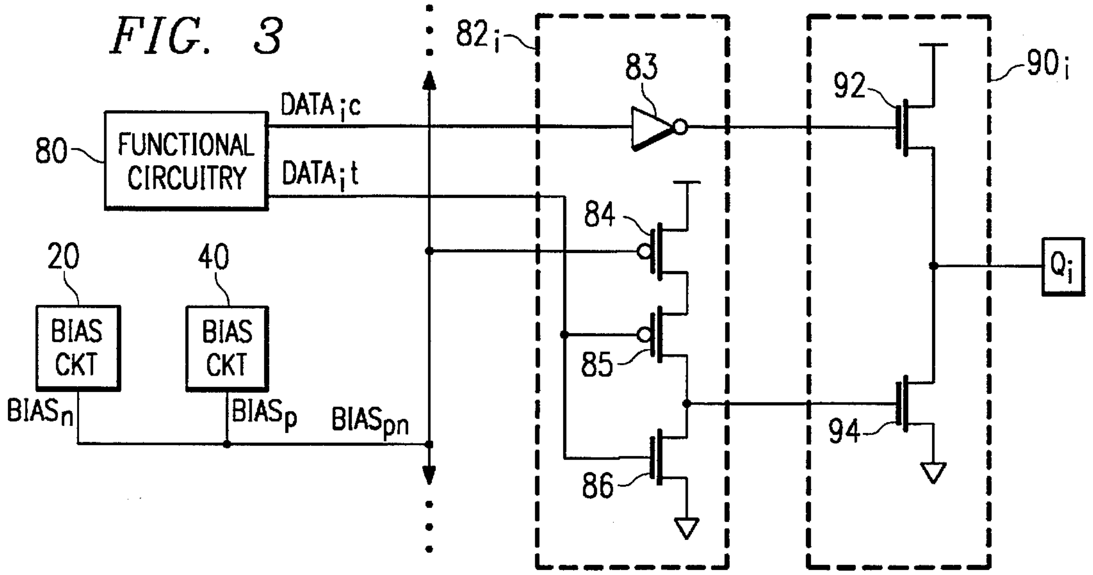
FIG. 4
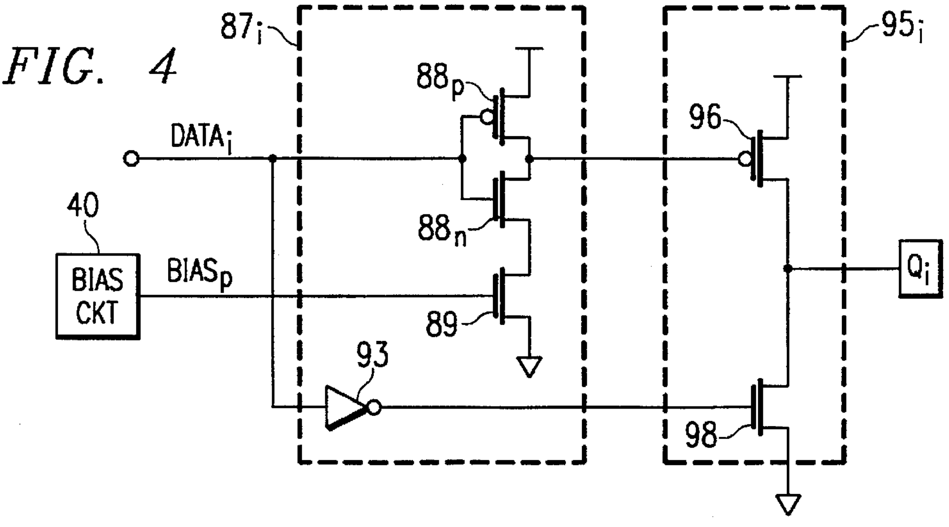

FIG. 2
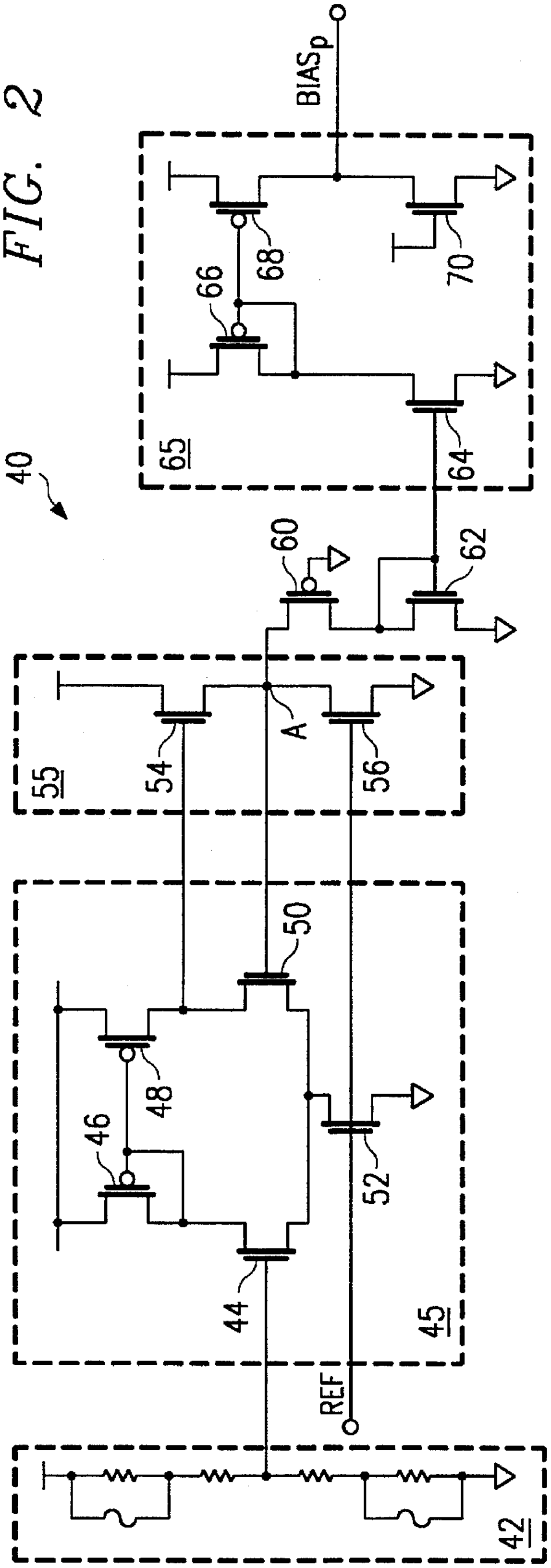
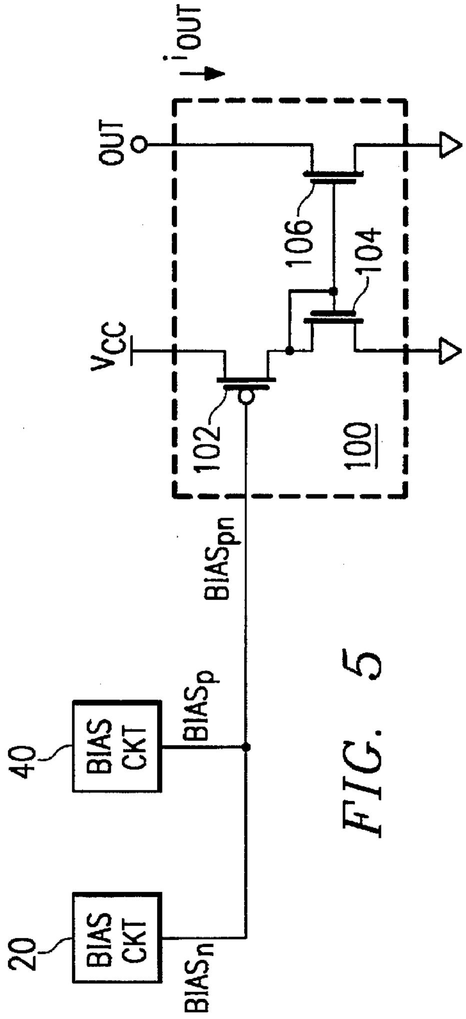
FIG. 5

CIRCUIT FOR PROVIDING A BIAS VOLTAGE COMPENSATED FOR P-CHANNEL TRANSISTOR VARIATIONS

This application is a continuation-in-part of application Ser. No. 08/357,664 (Attorney's Docket No. 94-C-114), filed Dec. 16, 1994, now U.S. Pat. No. 5,568,084 and of application Ser. No. 08/399,079 (Attorney's Docket No. 94-C-124), filed Mar. 8, 1995 now abandoned, both of which are assigned to SGS-Thomson Microelectronics, Inc., and both of which are incorporated hereinto by reference.

This invention is in the field of integrated circuits, and is more particularly directed to the generation of a bias voltage that is compensated for manufacturing process variations.

BACKGROUND OF THE INVENTION

As is fundamental in the art, the high performance available from modern integrated circuits derives from the transistor matching that automatically results from the fabrication of all of the circuit transistors on the same integrated circuit chip. This matching results from all of the devices on the same chip being fabricated at the same time with the same process parameters. As such, integrated circuits operate in a matched manner over wide variations in power supply voltage, process parameters (threshold voltage, channel length, etc.), and temperature.

However, mere matched operation of the devices on the integrated circuit does not guarantee proper operation, but only means that all devices operate in a matched fashion relative to one another. If, for example, the integrated circuit is manufactured at its "high-current corner" conditions (minimum channel lengths, minimum threshold voltages), all transistors in the chip will have relatively high gains, and will switch relatively quickly; the integrated circuit will thus operate at its fastest, especially at low temperature with maximum power supply voltage applied. Conversely, if the integrated circuit is manufactured at its "low-current corner" (maximum channel lengths, maximum threshold voltages), all transistors in the chip will have relatively low gains and slow switching speeds, and the integrated circuit will operate at its slowest rate, especially at high temperature and the minimum power supply voltage. Accordingly, the factors of processing variations, power supply voltage, and temperature greatly influence the speed and overall functionality of the integrated circuit.

The circuit designer must take into account variations such as these when designing the integrated circuit. For example, the circuit designer may wish to have a certain internal clock pulse to occur very quickly in the critical data path of an integrated memory circuit. However, variations in process, voltage and temperature limit the designer's ability to set the fastest timing of the clock pulse at the slowest conditions (low-current process corner, low voltage, high temperature) without considering that the circuit may be so fast at its fastest conditions (high-current process corner, high voltage, low temperature) that the clock may occur too early or have too narrow a pulse width. An example of such an internal clock pulse is the clock pulse for the sense amplifier in an integrated circuit memory. While additional delay directly increases the access time, incorrect data may be sensed if the sense amp clock occurs too early (i.e., switches too fast).

In addition, many functional circuits internal to an integrated circuit rely upon current sources that conduct a stable current. Examples of such functional circuits include voltage regulators, differential amplifiers, sense amplifiers, current mirrors, operational amplifiers, level shift circuits, and reference voltage circuits. Such current sources are generally implemented by way of field effect transistors, with a reference voltage applied to the gate of the field effect transistor.

As is known in the art, the integrated circuits utilizing such current sources would operate optimally if the current provided by the current source were to be stable over variations in operating and process conditions. However, as is well known in the art, the drive characteristics of MOS transistors can vary quite widely with these operating and process variations. Conventional MOS transistor current sources will generally source more current at low operating temperature (e.g., 0° C.), high $V_{cc}$ power supply voltage (e.g., 5.3 volts for a nominal 5 volt power supply), and process conditions that maximize drive (e.g., shorter than nominal channel length); conversely, these current sources will source less current at high operating temperature (e.g., 100° C.), low $V_{cc}$ power supply voltage (e.g., 4.7 volts for a nominal 5 volt power supply), and process conditions that minimize drive current (e.g., longer than nominal channel length). The ratio between the maximum current drive and minimum current drive for such conventional current sources has been observed to be on the order of 2.5 to 6.0. The behavior of circuits that rely on these current sources will therefore tend to vary greatly over these operating and process conditions, requiring the circuit designer to design for a greater operating margin, thus reducing the maximum performance of the integrated circuit.

Many modern integrated circuits are implemented by way of circuits that are controlled by a reference voltage. For example, the current source circuit discussed above is generally implemented as a field effect transistor receiving a reference voltage at its gate. Other circuits, particularly those that control the switching response of logic circuits within modern integrated circuits, may use a series field effect transistor with its gate controlled by a reference voltage to control the switching speed, or slew rate, of the circuit. The reference voltages used in these circuits is produced by a voltage reference circuit, or bias circuit, that is preferably designed to provide a stable reference voltage.

For example, one common technique uses a bias circuit that attempts to compensate for temperature variations. This conventional example relies on the well-known inverse variation of the threshold voltage of a MOS transistor over temperature, by using temperature-dependent threshold voltage variations to produce a temperature-compensating bias voltage. It has been observed, however, that such circuits are not well-suited to compensate for both temperature variations and process parameter variations, since the threshold voltage is itself a process parameter. Variations in the process parameters may thus affect the ability of the circuit to compensate for temperature, such that conventional temperature-compensated bias voltage generating circuits are not well compensated for variations in manufacturing process parameters.

In addition, as described in the above-incorporated application Ser. No. 08/357,664, it has been found to be desirable, for some applications, to provide a reference voltage that tracks variations in the power supply voltage. This tracking reference voltage can allow certain circuit functions, such as output driver slew rate control circuits, to operate in a consistent manner over a wide range of power supply voltages.

It is therefore an object of the present invention to provide a bias circuit for producing a compensated bias voltage that follows variations in power supply voltage and process parameters.

It is a further object of the present invention to provide such a bias circuit that so robustly compensates for variations in power supply voltage and process parameters that temperature variations need not be considered.

It is a further object of the present invention to provide such a bias circuit that compensates for variations in p-channel field effect transistor and process parameters.

It is a further object of the present invention to provide such a bias circuit that compensates for variations in transistor and process parameters for field effect transistors of both p-channel and n-channel types.

Other objects and advantages of the present invention will be apparent to those of ordinary skill in the art having reference to the following specification together with its drawings.

SUMMARY OF THE INVENTION

The present invention may be implemented into a bias circuit for producing a voltage that tracks variations in process parameters and power supply voltage. The bias voltage is based on a resistor voltage divider that sets the current in the input leg of a current mirror; the output leg of the current mirror generates the bias voltage applied to the logic gate. The bias circuit is based on a modulating transistor that is maintained in saturation, which in turn dictates the current across a linear load device. As a result, the bias voltage will be modulated as a function of transistor drive current (which is based on the power supply voltage), such that the bias voltage tracks increases in the power supply voltage (and thus increases in drive current). Further, variations in the current through the current mirror, for example as result from process parameter variations, are reflected in the voltage across the linear load device. Robust compensation for variations in power supply voltage and process parameters is thus produced.

The present invention may also be implemented into a bias voltage reference circuit that compensates for variations in the process parameters for p-channel transistors. In this implementation, the modulating transistor is a p-channel transistor, which receives a ratioed power supply voltage at its source, such that the current therethrough is modulated according to power supply voltage variations and p-channel process parameters. The current through the p-channel modulating transistor is applied to a linear load, either directly or via a current mirror, thus creating a compensating reference voltage.

BRIEF DESCRIPTION OF THE DRAWINGS

FIG. 1 is an electrical diagram, in schematic form, of a bias circuit according to a first preferred embodiment of the invention.

FIG. 2 is an electrical diagram, in schematic form, of a bias circuit according to a second preferred embodiment of the invention, and which compensates for variations in p-channel transistor and process parameters.

FIG. 3 is an electrical diagram, in block and schematic form, of an integrated circuit including an output driver incorporating the bias circuits of FIGS. 1 and 2.

FIG. 4 is an electrical diagram, in block and schematic form, of another output driver incorporating the bias circuits of FIG. 2.

FIG. 5 is an electrical diagram, in schematic form, of a constant current source incorporating the bias circuits of FIGS. 1 and 2.

DETAILED DESCRIPTION OF THE PREFERRED EMBODIMENTS

Figure 6:
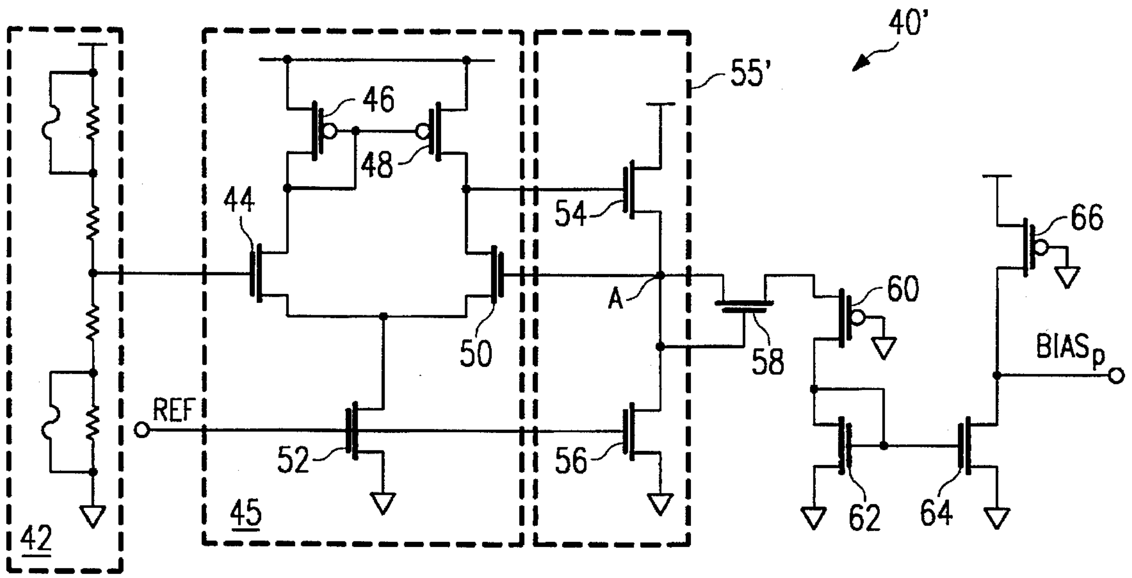
FIG. 6 is an electrical diagram, in schematic form, of a bias circuit which compensates for variations in p-channel transistor and process parameters, according to an alternative embodiment of the present invention.

Referring now to FIG. 1, the construction and operation of bias circuit 20 according to a first preferred embodiment of the invention will now be described in detail. In general, bias circuit 20 is a current mirror bias circuit, in which the reference leg of the mirror is responsive to a voltage divider. As will be evident from the description hereinbelow, bias circuit 20 is intended to provide a bias voltage on line $BIAS_n$ to that varies in a consistent manner with variations in the value of power supply voltage $V_{cc}$, and in a way that is matched for certain manufacturing process parameters.

For example, bias circuit 20 may provide such a voltage on line $BIAS_n$ to the gate of a pull-up p-channel transistor in a push-pull output driver. In such a case, it is preferable that the gate-to-source voltage of the pull-up p-channel transistor remain substantially constant over variations in $V_{cc}$, so that its current remains constant; in other words, so that the voltage at its gate on line $BIAS_n$ follows variations in the voltage at its source (i.e., $V_{cc}$). This stabilizes the drive characteristics of the push-pull driver at an optimized operating point, thus ensuring optimized operation of the integrated circuit over its specification range.

In this embodiment of the invention, bias circuit 20 includes a voltage divider of resistors 21, 23 connected in series between the $V_{cc}$ power supply and ground. The output of the voltage divider, at the node between resistors 21, 23, is presented to the gate of an n-channel transistor 28. Resistors 21, 23 are preferably implemented as polysilicon resistors, in the usual manner. As shown in FIG. 1, additional resistors 25, 27 may also be present in each leg of the voltage divider, with fuses 24, 26 connected in parallel therewith. In this way, the integrated circuit into which bias circuit 20 is implemented is fuse-programmable to allow adjustment of the voltage applied to the gate of transistor 28, if desired. Indeed, it is contemplated that multiple ones of additional resistors 25, 27 and accompanying fuses may be implemented in the voltage divider, to allow a wide range of adjustment of the voltage output of the voltage divider.

As indicated above, the gate of transistor 28 receives the output of the voltage divider of resistors 21, 23. The source of transistor 28 is biased to ground, and the drain of transistor 28 is connected to the drain and gate of p-channel transistor 30, which in turn has its source tied to $V_{cc}$. The combination of transistors 28, 30 is a reference leg of a current mirror, with the current conducted therethrough substantially controlled by the voltage output of the voltage divider of resistors 21, 23. Accordingly, the voltage applied to the gate of transistor 28, and thus the current conducted by transistors 28, 30 in the reference leg of the current mirror, will vary with variations in the voltage of the $V_{cc}$ power supply, but will maintain the same ratio relative to the varying $V_{cc}$.

The output leg of the current mirror in bias circuit 20 includes p-channel mirror transistor 32 and linear load device 34. P-channel transistor 32 has its source connected to $V_{cc}$ and its gate connected to the gate and drain of transistor 30, in current mirror fashion. The drain of transistor 32 is connected to the linear load device 34, at line BIAS$_n$. Load device 34 may be implemented as an n-channel transistor 34, having its source at ground and its gate at $V_{cc}$, in which case the common drain node of transistors 32, 34 drives the bias voltage output on line BIAS$_n$. Alternatively, linear load device 34 may be implemented as a precision resistor, or as a two-terminal diode.

In any case, linear load device 34 is important in providing compensation for variations in process parameters, such as channel length. Variations in the channel length of transistors 30, 32 will cause variations in the current conducted by transistor 32 and thus, due to the linear nature of load device 34, will cause a corresponding variation in the voltage on line BIAS$_n$. Accordingly, bias circuit 20 provides an output voltage on line BIAS$_n$ that tracks variations in process parameters affecting current conduction by transistors in the integrated circuit.

As noted above, the current conducted by transistor 32 is controlled to match, or to be a specified multiple of, the current conducted through transistor 30. Since the current conducted through transistors 28, 30 is controlled according to the divided-down voltage of the $V_{cc}$ power supply, the current conducted by transistor 32 (and thus the voltage on line BIAS$_n$) is therefore controlled by the $V_{cc}$ power supply. The voltage on line BIAS$_n$ will thus also track modulation in the $V_{cc}$ power supply voltage, as will be described in further detail hereinbelow, by way of modulation in the voltage drop across linear load 34.

Certain sizing relationships among the transistors in bias circuit 20 are believed to be quite important in ensuring proper compensation. Firstly, transistor 28 is preferably near, but not at, the minimum channel length and channel width for the manufacturing process used. Use of near the minimum channel length is preferable, so that the current conducted by transistor 28 varies along with variations in the channel length for the highest performance transistors in the integrated circuit; use of a longer channel length would result in less sensitivity of transistor 28 to process variations. However, the channel length is somewhat larger than minimum so that hot electron effects and short channel effects are avoided. Transistor 28 also preferably has a relatively small, but not minimum, channel width, to minimize the current conducted therethrough, especially considering that bias circuit 20 will conduct DC current at all times through transistors 28, 30 (and mirror leg transistor 32 and linear load 34). An example of the size of transistor 28 according to a modern manufacturing process would be a channel length of 0.8 μm and a channel width of 4.0 μm, where the process minimums would be 0.6 μm and 1.0 μm, respectively.

P-channel transistors 30, 32 must also be properly sized in order to properly bias transistor 28 and linear load device 34 (when implemented as a transistor), respectively. For proper compensation of the bias voltage on line BIAS$_n$, transistor 28 is preferably biased in the saturation (square law) region, while transistor 34 is biased in the linear (or triode) region. This allows transistor 34 to act effectively as a linear resistive load device, while transistor 28 remains saturated. As is evident from the construction of bias circuit 20 in FIG. 1, such biasing depends upon the relative sizes of transistor 28 and 30, and the relative sizes of transistors 32 and 34.

It is preferable for transistor 30 to be as large as practicable so that the voltage at the gate of transistor 28 may be as near to $V_{cc}$ as possible while maintaining transistor 28 in saturation. This is because variations in $V_{cc}$ will be applied to the gate of transistor 28 in the ratio defined by the voltage divider of resistors 21, 23; accordingly, it is preferable that this ratio be as close to unity as possible, while still maintaining transistor 28 in saturation. A large W/L ratio for transistor 30 allows its drain-to-source voltage to be relatively small, thus pulling the drain voltage of transistor 28 higher, which allows the voltage at the gate of transistor 28 to be higher while still maintaining transistor 28 in saturation. The tracking ability of bias circuit 20 is thus improved by transistor 30 being quite large.

In the above example, where the $V_{cc}$ power supply voltage is nominally 5.0 volts, the following table indicates the preferred channel widths (in microns) of transistors 28, 30, 32 and 34 in the arrangement of FIG. 1, for the case where the channel length of each is 0.8 μm:

TABLE

| Transistor | Channel Width (μm) |
|---|---|
| 28 | 4.0 |
| 30 | 32.0 |
| 32 | 76.0 |
| 34 | 4.0 |

It has been observed (through simulation) that this example of bias circuit 20 is effective in maintaining good tracking of the voltage on line BIAS$_n$ over a relatively wide range of $V_{cc}$ supply voltage, for both low-current process parameters (i.e., maximum channel length) and high-current process parameters (i.e., minimum channel length). This tracking of $V_{cc}$ by the voltage on line BIAS$_n$ is quite accurate, even over wide ranges in temperature and process parameters. Detailed simulation results are provided in application Ser. No. 08/357,664, incorporated hereinabove by reference.

As evident from the foregoing description, compensation of n-channel transistor and process parameters, as well as tracking of the $V_{cc}$ voltage, is readily provided in bias circuit 20. This tracking is provided in large part by the application of a ratio of $V_{cc}$ to the gate of an n-channel transistor that has its source at a fixed reference voltage, namely ground. It is also desirable to compensate for p-channel transistor and process parameter variations in providing such a tracking reference voltage. However, since the source of a p-channel transistor is biased to a high voltage (i.e., either $V_{cc}$ itself or a voltage derived therefrom), the direct implementation of bias circuit 20 to provide a p-channel modulating transistor will not provide the desired tracking, since the voltage at both the gate and the source of the p-channel modulating transistor would follow $V_{cc}$ variations. Modulation in both the gate and source voltages would result in a relative constant current conducted by the p-channel transistor, negating its ability to generate a tracking voltage across a load.

Referring now to FIG. 2, bias circuit 40 according to another preferred embodiment of the invention, and directed to this problem of providing a reference voltage that tracks $V_{cc}$ in a manner that compensates for variations in process parameters for p-channel field effect transistors, will now be described in detail.

Bias circuit 40 includes resistor divider 42, similarly constructed as in bias circuit 20 described hereinabove, and preferably including fuse programmability for setting the divider ratio as also described hereinabove. The output of resistor divider 42, which will be a selected ratio of the $V_{cc}$ power supply voltage, is applied to the gate of n-channel transistor 44 in the input leg of differential stage 45. Transistor 44 has its source connected to a common node at the drain of n-channel current source transistor 52, and has its drain connected to the drain and gate of p-channel transistor 46. P-channel transistor 46 has its source biased to $V_{cc}$, and has its gate and drain connected to the gate of p-channel transistor 48 in the output leg of differential stage 45. The source of transistor 48 is also biased to $V_{cc}$. N-channel transistor 50 has its drain connected to the drain of transistor 48, and has its source connected to the common node at the drain of current source transistor 52; the gate of current source transistor 52 is biased by a reference voltage on line REF.

The common drains of transistors 48 and 50 are connected to the gate of an n-channel transistor 54 in intermediate stage 55 following the current mirror. The drain of transistor 54 is biased to $V_{cc}$, while the source of transistor 54 is connected, at node A, to the drain of n-channel transistor 56 which has its source at ground and its gate biased by the reference voltage on line REF. Node A is also connected to the gate of transistor 50 in differential stage 45.

It is contemplated that the reference voltage on line REF may be generated by a conventional reference voltage generator circuit, such as a bandgap reference voltage circuit or the like. Neither the particular value of this reference voltage on line REF, nor its behavior relative to $V_{cc}$ variations or transistor and process parameter variations, is believed to be critical, as the functions of current source transistors 52, 56 are merely to maintain operating bias on the other transistors in their series paths.

Node A, at the output of intermediate stage 55, is connected to the source of p-channel modulating transistor 60. Modulating transistor 60 has its gate biased to ground, and as its drain connected to the drain and gate of n-channel load transistor 62, and to output stage 65 (the construction of which will be described hereinbelow). Modulating transistor 60 is preferably biased in the saturation (square law) region, through the action of transistor 62, so that variations in the voltage at node A (i.e., the source of transistor 60) will directly control the current conducted thereby. As in the case of transistor 28 in bias circuit 20, p-channel modulating transistor 60 preferably has a channel length that is near, but not at, the minimum p-channel transistor channel length for the manufacturing process, so that its current varies along with variations in the channel length for the highest performance p-channel transistors in the integrated circuit, while still avoiding hot electron effects and short channel effects. P-channel modulating transistor 60 also preferably has a relatively small, but not minimum, channel width, to minimize the current conducted therethrough and thus to minimize active power dissipation.

According to this embodiment of the invention, current mirror output stage 65 is provided to generate the voltage $BIAS_p$ at the desired level. Current mirror output stage 65 thus includes a reference leg in which n-channel transistor 64 has its gate connected to the gate and drain of transistor 62, and has its source at ground. The drain of transistor 64 is connected to the drain and gate of p-channel transistor 66 in the reference leg, which has its source biased to $V_{cc}$. In the mirror leg of current mirror output stage 65, p-channel transistor 68 has its source biased to $V_{cc}$, has its gate connected to the gate and drain of transistor 66 in the reference leg, and has its drain connected, at output line $BIAS_p$, to the drain of n-channel linear load transistor 70. The gate of load transistor 70 is biased to $V_{cc}$, and its source is maintained at ground.

The operation of bias circuit 40 will now be described in detail. In operation, the gate of transistor 44 in the input leg of differential stage 45 receives a selected ratio of the $V_{cc}$ from resistor divider 42. As a result of the mirror action of transistors 46, 48, a current is conducted through transistor 48 that corresponds to the current conducted through transistor 46 as controlled by transistor 44, depending upon the size ratio of transistors 46, 48 relative to one another; current source transistor 52, of course, sets the sum of the currents through transistors 46, 48. The gate of transistor 50 in the output leg of differential stage 45 receives the voltage at node A which, of course, depends upon the voltage at the gate of transistor 54 in intermediate stage 55. Accordingly, due to the action of differential stage 45, the voltage at node A will tend to match the voltage at the gate of transistor 44 in the input leg, which is set by resistor divider 42 and the $V_{cc}$ power supply voltage.

The voltage at node A, which tracks the divided voltage from resistor divider 42, is applied to the source of p-channel modulating transistor 60, which has its gate biased to ground, as noted above, and which is in the saturation region due to the bias action of transistor 62. Accordingly, with the gate voltage of transistor 60 fixed at ground, the current through transistor 60 will depend upon the divided $V_{cc}$ voltage from resistor divider 42, according to the particular transistor parameters of transistor 60 as defined by the manufacturing process. The diode connection of transistor 62 thus will cause the voltage at its gate, which is also at the gate of transistor 64 in current mirror output stage 65, to vary with the current conducted by transistor 60 (and transistor 62), and thus to vary with the divided $V_{cc}$ voltage and the parameters of transistor 60.

The current through the reference leg of current mirror output stage 65 is controlled by the voltage at the gate of transistor 64, which is the voltage at the common drain node of transistors 60, 62. The current through transistors 64, 66 is mirrored by transistor 68, and applied to load device 70 in the mirror leg of current mirror output stage 70. Of course, the current through transistor 68 will depend both upon the current through transistor 66, and also upon the relative sizes of transistors 66, 68 (i.e., upon the mirror ratio of current mirror output stage 65). As in the case of bias circuit 20 described hereinabove, linear load transistor 70 is preferably biased in the linear (or triode) region, so that load transistor 70 acts effectively as a linear resistive load device; alternatively, load device 70 may be implemented as a precision resistor, or as a two-terminal diode. In this way, the current conducted by transistors 68, 70 is reflected as a voltage on line $BIAS_p$.

Accordingly, the output voltage from bias circuit 40 on line $BIAS_p$ will vary with the current through transistors 68, 70. This current depends upon the voltage at the gate of transistor 64, which in turn depends upon the current conducted by transistor 60. Transistor 60 is, of course, controlled to conduct current according to the voltage at its source, which is a voltage that tracks the ratioed $V_{cc}$ voltage from resistor divider 42. Furthermore, the current conducted by transistor 60 will, of course, depend upon the specific transistor parameters of transistor 60. As a result, the voltage on line $BIAS_p$ will closely follow variations in the $V_{cc}$ power supply voltage, in a manner that compensates for variations in p-channel process and device parameters.

According to the preferred embodiment of the invention, the same integrated circuit may include both bias circuit 20 and bias circuit 40, and thus produce reference voltages on lines $BIAS_n$, $BIAS_p$ that track $V_{cc}$ in a way that compensates for both n-channel and p-channel process parameters. Furthermore, given the above description, the specific voltage levels $BIAS_n$, $BIAS_p$ should closely match one another (assuming proper selection of current mirror ratios, etc.). In some circumstances, one may short line $BIAS_n$ to line $BIAS_p$ to produce a single bias reference voltage $BIAS_{pn}$ that tracks variations in the $V_{cc}$ power supply voltage and that compensates for both p-channel and n-channel process variations.

Referring now to FIG. 3, a first embodiment of the invention utilizing the tracking bias reference voltage $BIAS_{pn}$ will now be described in detail. As described in application Ser. No. 08/357,664, incorporated hereinabove by reference, generation of a compensated reference voltage that tracks variations in the $V_{cc}$ power supply is especially useful in the control of the slew rate of output driver circuitry. According to this embodiment of the invention, the integrated circuit of FIG. 3 includes such slew rate control by a reference voltage that tracks $V_{cc}$ variations, and that is compensated for variations in both n-channel and p-channel transistor and process parameters.

In the integrated circuit of FIG. 3, functional circuitry 80 presents output data, resulting from its operations, on multiple lines commonly referred to as a data bus, for communication to its output terminals. Functional circuitry 80 may be of various conventional types, depending upon the particular integrated circuit; examples of functional circuitry 80 include a memory array from which stored data is read by sense amplifiers, a logic circuit such as a microprocessor, custom semi-custom logic circuitry, and the like. The output terminals of the integrated circuit may be dedicated output terminals, or alternatively may be common input/output terminals, as is well known in the art.

In the example of FIG. 3, the circuitry for outputting a single data bit on output terminal $Q_i$ is shown in detail for clarity of description; it is of course to be understood that multiple output terminals, with similar circuitry, will generally be present in the integrated circuit of FIG. 3. Functional circuitry 80 presents the $i^{th}$ bit of output data on complementary data bus lines $DATA_i$t and $DATA_i$c (the "t" and "c" designators indicating true and complement data, respectively). Data bus lines $DATA_i$t and $DATA_i$c are received by output buffer $\mathbf{82}_i$, which in turns controls output driver $\mathbf{90}_i$.

Output driver $\mathbf{90}_i$ is a push-pull driver, which drives the state of output terminal $Q_i$ according to the state of data bus lines $DATA_i$t and $DATA_i$c from functional circuitry 80. In this example, n-channel pull-up transistor 92 has its drain biased to $V_{cc}$ and n-channel pull-down transistor 94 has its source biased to ground. The drain of transistor 94 is connected to the source of transistor 92 at output terminal $Q_i$, and the gates of transistors 92, 94 receive signals from output buffer $\mathbf{82}_i$ to drive output terminal $Q_i$ with the proper data state.

Output buffer $\mathbf{82}_i$ includes inverter 83, which receives data bus line $DATA_i$c at its input, and which drives the gate of pull-up transistor 92 in output driver $\mathbf{90}_i$ with its output. On the pull-down side, output buffer $\mathbf{82}_i$ includes p-channel transistors 84, 85 and n-channel transistor 86, all having their source-drain paths connected in series between $V_{cc}$ and ground; the source of p-channel transistor 84 is connected to $V_{cc}$, and the source of n-channel transistor 86 is connected to ground, in this example. The gates of transistors 85, 86 receive data bus line $DATA_i$t from functional circuitry 80, and their drains are connected together to the gate of pull-down transistor 94 in output driver $\mathbf{90}_i$. Of course, additional transistors and control may be implemented in output buffer $\mathbf{82}_i$, to effect such functions as a high-impedance output state during output disable.

In this embodiment of the invention, the slew rate of pull-down transistor 94 is to be controlled according to a reference voltage that tracks variations in $V_{cc}$ and that is compensated for variations in both n-channel and p-channel transistor and process parameters. Accordingly, the integrated circuit of FIG. 3 includes both bias circuit 20 and also bias circuit 40, as described hereinabove. Line $BIAS_n$ from bias circuit 20 is connected to line $BIAS_p$ from bias circuit 40, to produce a voltage on line $BIAS_{pn}$. Line $BIAS_{pn}$ is connected to the gate of transistor 84 in output buffer $\mathbf{82}_i$, to control the rate at which pull-up transistor 94 is turned on responsive to an output data state transition.

In operation, if a "1" data state is to be presented at output terminal $Q_i$, functional circuitry 80 will generate a high level on data bus line $DATA_i$t and a low level on data bus line $DATA_i$c. The low level on data bus line $DATA_i$c will be inverted by inverter 83 and presented to the gate of transistor 92 to turn it on, driving output terminal $Q_i$ toward $V_{cc}$. Conversely, data bus line $DATA_i$t will be at a high logic level, turning off transistor 85, and turning on transistor 86 to pull the gate of output pull-down transistor 94 to ground, turning it off.

For transition to a "0" data state at output terminal $Q_i$, data bus line $DATA_i$c presents a high logic level to inverter 83, which turns off transistor 92 by applying a low logic level at its gate. Conversely, data bus line $DATA_i$t presents a low logic level to transistors 85, 86, turning off transistor 86 and turning on transistor 85. In this condition, the voltage on line $BIAS_{pn}$ limits the amount of current that is applied from $V_{cc}$ to the gate of transistor 94, and thus controls the rate at which transistor 94 is turned on to pull output terminal $Q_i$ low. As noted above, the voltage on line $BIAS_{pn}$ will track variations in the $V_{cc}$ power supply, in such a manner that the gate-to-source voltage of p-channel transistor 84 will remain substantially constant over such variations; this tracking results in consistent control of the slew rate of transistor 94 being turned on. Further, this voltage on line $BIAS_{pn}$, and thus the slew rate control, compensates for variations in both the n-channel and p-channel transistor and process parameters, such that the slew rate will be consistent across a wide population of the manufactured integrated circuits.

Referring now to FIG. 4, the use of p-channel compensated tracking bias circuit 40 according to another embodiment of the invention will now be described in detail. In this embodiment of the invention, output driver $\mathbf{95}_i$ is a CMOS push-pull driver for driving output terminal $Q_i$ responsive to a data state presented on data bus line $DATA_i$ from functional circuitry (not shown). As such, output driver $\mathbf{95}_i$ has a p-channel pull-up transistor 96 with its source at $V_{cc}$ its drain connected, at output terminal $Q_i$, to the drain of n-channel pull-down transistor 98. Output buffer $\mathbf{87}_i$ receives data bus line $DATA_i$ at the input of inverter 93, the output of which drives pull-down transistor 98. On the pull-up side, output buffer $\mathbf{87}_i$ includes p-channel transistor 88*p* and n-channel transistors 88*n*, 89 with their source/drain paths connected in series between $V_{cc}$ and ground; the source of transistor 89 is at ground, the source of transistor 88*p* is at $V_{cc}$. Transistors 88*p*, 88*n* have their gates in common to receive data bus line $DATA_i$, and have their drains in common to drive the gate of p-channel pull-up transistor 96. In this embodiment of the invention, the slew rate of the turn-on of transistor 96 is to be controlled in a manner that tracks $V_{cc}$ and in a manner that is compensated for variations in p-channel transistor and process parameters (given that pull-up transistor 96 is p-channel). As such, the gate of transistor 89 in output buffer $\mathbf{87}_i$ receives the voltage on line $BIAS_p$.

The operation of the circuit of FIG. 4 is similar to that described hereinabove relative to FIG. 3. To drive a "0" logic state at output terminal $Q_i$, the functional circuitry will place a low logic level on line $DATA_i$, which will turn off transistor 88*n*, and turn on transistor 88*p* to pull the gate of transistor 96 to $V_{cc}$, turning off transistor 96. This will also turn on transistor 98 via inverter 93, driving output terminal $Q_i$ toward ground to effect the low logic output level.

In the case where functional circuitry drives data bus line $DATA_i$ high to drive a "1" logic state at output terminal $Q_i$, inverter 93 turns off transistor 98. This state also turns off transistor 88*p* and turns on transistor 88*n*. The current discharged from the gate of transistor 96 to turn it on is, in this condition, controlled by the conduction of transistor 89 under the control of the voltage on line $BIAS_p$. Accordingly, the rate at which transistor 96 is turned on, and thus the rate at which output terminal $Q_i$ is pulled to $V_{cc}$, is therefore controlled by p-channel compensating bias circuit 40.

As described hereinabove, the voltage on line $BIAS_p$ tracks variations of the $V_{cc}$ power supply in a way that is compensated for variations in p-channel transistor and process parameters. Accordingly, the conduction through p-channel transistor 96 will remain constant over variations in $V_{cc}$, since the slew rate of the voltage at its gate will follow variations of the source voltage of transistor 96 (which is $V_{cc}$). The rate at which output terminal $Q_i$ is driven high will thus remain relatively constant over the power supply voltage range, and also relatively constant over the manufacturing population (due to the compensation provided by bias circuit 40 over p-channel parameter variations).

Of course, other alternatives to the output driver circuits of FIGS. 3 and 4 may be readily used. For example, the output driver may include only a single drive transistor, as may be the case in either an open-drain output stage or where a passive load is used in the output driver. In these cases, slew rate control of the turn-on of the single driver transistor may still be effected by presenting the tracking bias voltages to the output buffers in the manner described hereinabove. Other alternatives will, of course, be apparent to those of ordinary skill in the art having reference to this specification together with the drawings.

Referring now to FIG. 5, another use of the compensated tracking bias circuits according to the present invention will now be described in detail. In this example, bias circuits 20, 40 are used to generate a reference voltage applied to a constant current source, such that the output current remains relatively constant over variations in the $V_{cc}$ power supply voltage and also over variations of the manufacturing process as reflected in variations of transistor parameters.

As shown in FIG. 5, bias circuits 20, 40 are connected together at their outputs, such that lines $BIAS_n$, $BIAS_p$ are shorted to one another at line $BIAS_{pn}$. As described hereinabove, line $BIAS_{pn}$ will thus present a reference voltage that tracks variations in the $V_{cc}$ power supply, in a manner that compensates for variations in both n-channel and p-channel transistor and process parameters. Alternatively, only a single one of bias circuits 20, 40 may be used to generate the tracking reference voltage, in those cases where process parameter compensation for only one of the conductivity types is necessary. Application Ser. No. 08/399,079, incorporated hereinabove by reference, describes an example where only bias circuit 20 is used to control the constant current source.

As shown in FIG. 5, line $BIAS_{pn}$ is applied to current mirror 100, specifically to the gate of p-channel transistor 102 in its reference leg. The source of transistor 102 is biased to $V_{cc}$, and the drain of transistor 102 is connected to the drain and gate of n-channel transistor 104, which has its source at ground. The drain and source of transistor 102 are connected to the gate of n-channel output transistor 106, having its source also at ground, and configured in an open-drain fashion. Output transistor 106 is thus controlled as a current source, with its drain current $i_{OUT}$ being maintained at a constant level, as will be described hereinbelow, responsive to the level on line $BIAS_{pn}$.

In operation, the voltage on line $BIAS_{pn}$ controls the conduction of transistor 102, with the resultant voltage at its drain, and at the drain and gate of transistor 104, controlling the current conducted by output transistor 106. As described in the above-incorporated application Ser. No. 08/399,079, the current source of FIG. 5 provides a relatively constant output current $i_{OUT}$ as a result of the tracking of variations in power supply voltage and process parameters by bias circuits 20, 40 in their generation of the bias voltage on line $BIAS_{pn}$. This constancy in the output current $i_{OUT}$ results from the commonality in the conditions that shift the voltage on line $BIAS_{pn}$ similarly affecting the drive characteristics of the transistors in current mirror 100. Specifically, both those variations in the process conditions that shift the voltage on line $BIAS_{pn}$ and also variations in the power supply voltage $V_{cc}$ affect the drive characteristics of transistor 102 in the reference leg of current mirror 100, with the net effect being that the reference current conducted by transistors 102, 104, and thus the mirror current conducted by transistor 106, are substantially constant over these variations.

Bias circuit 40 described hereinabove may be constructed according to certain variations, while still providing the advantages of generating a voltage on line $BIAS_p$ that tracks $V_{cc}$ modulation, and which compensates for p-channel transistor and process variations. Bias circuit 40' according to one of such variations is illustrated in FIG. 6, using like reference numerals for like elements as previously described relative to bias circuit 40 of FIG. 2.

As shown in FIG. 6, bias circuit 40' is constructed substantially similarly as bias circuit 40 described hereinabove. However, bias circuit 40' also includes n-channel transistor 58 which has its drain and gate connected at node A, in diode fashion, and its source connected to the source of modulating p-channel transistor 60. The source/drain path of transistor 58 is thus connected in series between node A and the source of modulating p-channel transistor 60. This connection of transistor 58 adjusts the voltage at the source of modulating p-channel transistor 60 to be one n-channel threshold voltage less than the ratioed voltage from resistor divider 42, reducing the gate-to-source voltage at transistor 60 and thus reducing its current. Accordingly, by adjusting the conduction through modulating p-channel transistor 60, transistor 58 adjusts the absolute value of the output voltage on line $BIAS_p$ to be higher than in the case of bias circuit 40, while still maintaining the tracking effect of the voltage on line $BIAS_p$ and its compensation for p-channel process and transistor parameter variations.

Also according to this alternative embodiment of the invention, bias circuit 40' further includes a different output stage from that of bias circuit 40 of FIG. 2. As shown in FIG. 6, the drain and gate of transistor 62 (and the drain of transistor 60) are connected to the gate of n-channel transistor 64. Transistor 64 has its source at ground, and its drain connected to the drain of p-channel load transistor 66 at line $BIAS_p$; transistor 66 has its gate at ground, and its source at $V_{cc}$, and as such merely acts as a load to transistor 64. This non-mirrored output stage arrangement may be used if the voltage level on line $BIAS_p$ so generated is appropriate for the particular application. The same benefits of $V_{cc}$ tracking and p-channel process and transistor parameter compensation are provided by bias circuit 40' as discussed hereinabove.

While bias circuit 40' includes both the $V_t$ shift of transistor 58 and the non-mirrored output stage, it is of course to be understood that these two features are not necessarily implemented together in the same circuit. Either or both of these alternative features may be included in the bias circuit, as desired by the circuit designer.

Figure 7:
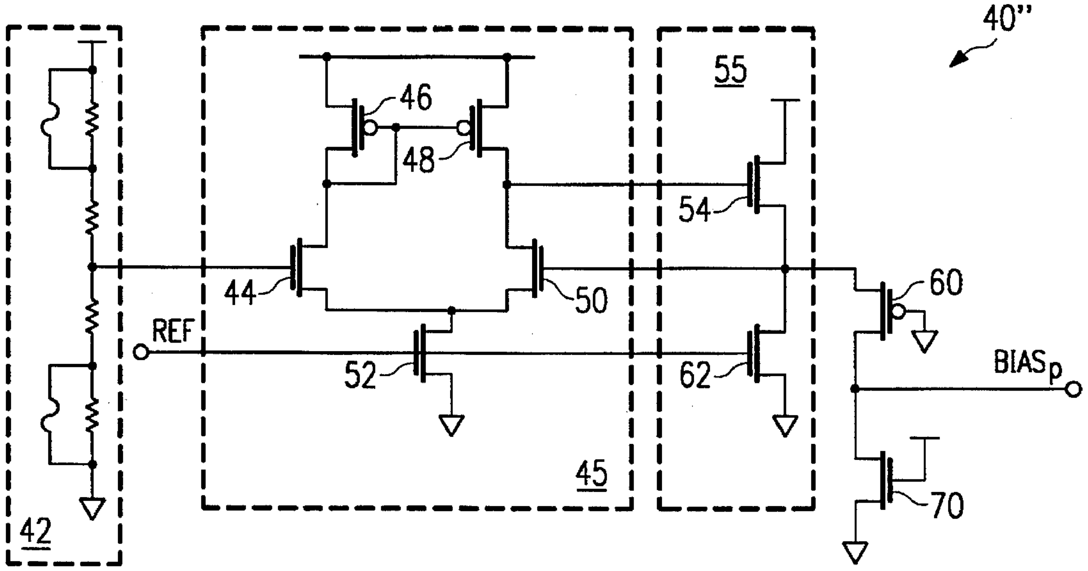
FIG. 7 is an electrical diagram, in schematic form, of a bias circuit which compensates for variations in p-channel transistor and process parameters, according to an alternative embodiment of the present invention.

Referring now to FIG. 7, another alternative embodiment of the bias circuit according to the present invention will now be described. Bias circuit 40" of FIG. 7 is similarly constructed as bias circuits 40, 40' described hereinabove, with the same reference numerals referring to similar elements, up to the point of the output stage. In this embodiment of the invention, however, bias circuit 40" directly connects the drain of n-channel linear load transistor 70 to the drain of modulating p-channel transistor 60, with the common drain node therebetween driving line $BIAS_p$; the gate of linear load transistor 70 is biased to $V_{cc}$. As before, it is contemplated that the voltage at the drain of transistor 70 will be biased in the linear (or triode) region. Accordingly, the current conducted by p-channel modulating transistor 60 will also be conducted by linear load transistor 70 and, according to the linear characteristic of transistor 70, will produce the voltage on line $BIAS_p$. The simple output stage of this embodiment of the invention may be used in such cases where the resulting voltage on line $BIAS_p$ is suitable for use in the integrated circuit in the manner described hereinabove. Of course, bias circuit 40" of FIG. 7 also provides the advantages of generating a reference voltage that tracks variations in $V_{cc}$, and in a manner that is compensated for variations in p-channel transistor and process parameters.

While the invention has been described herein relative to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

I claim:

1. A bias circuit for producing a tracking bias voltage in an integrated circuit, comprising:

a voltage divider coupled between a power supply voltage and a reference voltage, for producing a divided voltage that is proportional to the power supply voltage;

a differential stage circuit having first and second legs, said first leg having a first input coupled to receive the divided voltage from the voltage divider, said second leg having a second input connected to an intermediate output node, and having an output;

an intermediate stage circuit comprising:

a first transistor, having a conduction path, and having a control electrode coupled to the output of the second leg of the differential stage circuit; and a current source transistor, coupled to the conduction path of the first transistor at the intermediate output node, for conducting a reference current;

a p-channel modulating transistor, having a source coupled to the intermediate output node, having a gate coupled to a bias voltage so as to bias the p-channel modulating transistor in the saturation region, and having a drain, whereby the current conducted by the p-channel modulating transistor reflects the variations in the power supply voltage and is dependent on the p-channel device characteristics that are process dependent; and an output stage, coupled to the drain of the p-channel modulating transistor, for generating the tracking bias voltage in proportion to the current conducted by the p-channel modulating transistor.

2. The bias circuit of claim 1, wherein the output stage comprises:

a current mirror, comprising:

a control transistor having a conduction path, and having a control electrode coupled to the drain of the p-channel modulating transistor;

a reference transistor, having a conduction path connected in series with the control transistor between the power supply voltage and a reference voltage, and having a control electrode;

a mirror transistor, having a control electrode connected to the control electrode of the reference transistor, and having a conduction path for conducting a mirrored current corresponding to current conducted by the reference transistor; and a load, for conducting the mirrored current and for producing the tracking voltage responsive to the mirrored current.

3. The bias circuit of claim 2, further comprising:

an n-channel reference transistor, having a drain and gate connected to the drain of the p-channel modulating transistor and having a source biased by the reference voltage.

4. The bias circuit of claim 2, wherein the load comprises:

a load transistor, having a conductive path connected between the mirror transistor and the reference voltage, and having a control terminal for receiving a voltage biasing the load transistor in the linear region.

5. The bias circuit of claim 2, wherein the load comprises a resistor.

6. The bias circuit of claim 2, wherein the load comprises a diode.

7. The bias circuit of claim 1, wherein the output stage comprises:

an n-channel reference transistor, having a drain and gate connected to the drain of the p-channel modulating transistor and having a source biased by the reference voltage;

an output transistor, having a gate connected to the gate of the n-channel reference transistor, and having a source/drain path; and a load transistor, having a conduction path connected in series with the source/drain path of the output transistor between the power supply voltage and the reference voltage, and having a control electrode biased so that the load transistor is conductive;

wherein the tracking voltage is presented at a node between the conduction path of the load transistor and the source/drain path of the output transistor.

8. The bias circuit of claim 1, wherein the output stage comprises:

a load transistor, having a conduction path connected in series between the drain of the p-channel modulating transistor and the reference voltage, and having a control electrode biased so that the load transistor is conductive;

wherein the tracking voltage is presented at the drain of the p-channel modulating transistor.

9. The bias circuit of claim 1, wherein the differential stage circuit comprises:

a first current source, for conducting a sum current between a common node and the reference voltage;

a first control transistor in the first leg, having a conduction path connected on one side to the common node and having a control electrode connected to the voltage divider to receive the divided voltage therefrom;

a reference transistor in the first leg, having a source/drain path connected between the conduction path of the first control transistor and the power supply voltage, and having a gate connected to its drain;

a mirror transistor in the second leg, having a source/drain path connected on one side to the power supply voltage, and having a gate connected to the gate of the reference transistor; and a second control transistor in the second leg, having a conduction path connected between the source/drain path of the mirror transistor and the common node, and having a control electrode coupled to the source of the p-channel modulating transistor;

wherein the output of the differential stage circuit is presented at a node between the source/drain path of the mirror transistor and the conduction path of the second control transistor.

10. The bias circuit of claim 1, further comprising:

a diode connected between the intermediate output node and the source of the p-channel modulating transistor.

11. An integrated circuit, comprising:

functional circuitry, presenting an output data state on a data bus line;

an output driver circuit for driving an output terminal responsive to the output data state, comprising a first drive transistor, having a conduction path connected between the output node and a first bias voltage, and having a control terminal, the first drive transistor conductive responsive to its control terminal receiving a voltage at a first logic level;

an output buffer, having an input coupled to the data bus line and having an output coupled to the control terminal of the first drive transistor, and having a slew rate control transistor therein having a control electrode, and a conduction path controlling the rate at which the output buffer switches to present the first logic level at its output responsive to the voltage at the control electrode of the first drive transistor; and a first bias circuit for producing a first tracking bias voltage in the integrated circuit, comprising:

a voltage divider coupled between a power supply voltage and a reference voltage, for producing a divided voltage that is proportional to the power supply voltage;

a differential stage circuit having first and second legs, said first leg having a first input coupled to receive the divided voltage from the voltage divider, said second leg having a second input connected to an intermediate output node, and having an output;

an intermediate stage circuit comprising:

a first transistor, having a conduction path, and having a control electrode coupled to the output of the second leg of the differential stage circuit; and a current source transistor, coupled to the conduction path of the first transistor at the intermediate output node, for conducting a reference current;

a p-channel modulating transistor, having a source coupled to the intermediate output node, having a gate coupled to a bias voltage so as to bias the p-channel modulating transistor in the saturation region, and having a drain, whereby the current conducted by the p-channel modulating transistor reflects the variations in the power supply voltage and is dependent on the p-channel device characteristics that are process dependent; and an output stage, coupled to the drain of the p-channel modulating transistor, for presenting the first tracking bias voltage in proportion to the current conducted by the p-channel modulating transistor at an output connected to the control electrode of the slew rate control transistor in the output buffer.

12. The integrated circuit of claim 11, wherein the output buffer further comprises:

first and second transistors, having conduction paths connected in series with the conduction path of the slew rate control transistor between first and second bias voltages, and having control electrodes coupled to the data bus line;

wherein the control electrode of the first drive transistor is connected to an output node between the conduction paths of the first and second transistor, such that the conduction path of the slew rate control transistor is between the output node and the one of the first and second bias voltages corresponding to the first logic level.

13. The integrated circuit of claim 11, wherein the output driver circuit further comprises:

a second output drive transistor, having a conduction path connected between the output node and the second bias voltage, and having a control terminal, and being of an opposite conductivity type from that of the first output drive transistor so that the second drive transistor is conductive responsive to its control terminal receiving a voltage at a second logic level.

14. The integrated circuit of claim 13, wherein the first output drive transistor is a p-channel field effect transistor and the second output drive transistor is an n-channel field effect transistor.

15. The integrated circuit of claim 11, further comprising:

a second bias circuit for producing a second tracking bias voltage, comprising:

a voltage divider coupled between the power supply voltage and the reference voltage, for producing a divided voltage; and a current mirror, having a reference leg and an output leg, wherein the current through the reference leg is controlled by the divided voltage, and wherein the output leg comprises:

a mirror transistor, for conducting a mirrored current corresponding to the current through the reference leg; and a load, for conducting the mirrored current and for producing the second tracking bias voltage responsive to the mirrored current at an output connected to the control electrode of the slew rate control transistor in the output buffer.

16. A current source for an integrated circuit, comprising:

a first bias circuit, comprising:

a voltage divider coupled between a power supply voltage and a reference voltage, for producing a divided voltage that is proportional to the power supply voltage;

a differential stage circuit having first and second legs, said first leg having a first input coupled to receive the divided voltage from the voltage divider, said second leg having a second input connected to an intermediate output node, and having an output;

an intermediate stage circuit comprising:

a first transistor, having a conduction path, and having a control electrode coupled to the output of the second leg of the differential stage circuit; and a current source transistor, coupled to the conduction path of the first transistor at the intermediate output node, for conducting a reference current;

a p-channel modulating transistor, having a source coupled to the intermediate output node, having a gate coupled to a bias voltage so as to bias the p-channel modulating transistor in the saturation region, and having a drain, whereby the current conducted by the p-channel modulating transistor reflects the variations in the power supply voltage and is dependent on the p-channel device characteristics that are process dependent; and an output stage, coupled to the drain of the p-channel modulating transistor, for generating, at a tracking bias voltage output, a first tracking bias voltage in proportion to the current conducted by the p-channel modulating transistor; and an output current mirror, having a reference leg connected to the tracking bias voltage output for conducting a second reference current controlled by the first tracking bias voltage, and having an output leg for producing an output current mirroring the second reference current.

17. The current source of claim 16, further comprising:

a second bias circuit, comprising:

a voltage divider coupled between the power supply voltage and the reference voltage, for producing a divided voltage; and a current mirror, having a reference leg and an output leg, wherein the current through the reference leg is controlled by the divided voltage, and wherein the output leg comprises:

a mirror transistor, for conducting a first mirrored current corresponding to the current through the reference leg; and a load, connected to the tracking bias voltage output, for conducting the mirrored current to produce a second tracking bias voltage responsive to the mirrored current at the tracking bias voltage output.

18. The current source of claim 16, wherein the reference leg of the output current mirror comprises:

a first reference transistor, having a source/drain path, and having a gate receiving the tracking bias voltage at the tracking bias voltage output; and a second reference transistor having a source/drain path connected in series with the source/drain path of the first reference transistor between the power supply voltage and the reference voltage, and having a gate connected to its drain;

wherein the output leg of the output current mirror comprises an output transistor having a source/drain path, having a gate connected to the gate of the second reference transistor, and having a source biased to the same potential as the source of the second reference transistor.

* * * * *